(12) United States Patent
Gannon

(10) Patent No.: US 10,198,730 B2
(45) Date of Patent: *Feb. 5, 2019

(54) WIRELESS DEVICES FOR STORING A FINANCIAL ACCOUNT CARD AND METHODS FOR STORING CARD DATA IN A WIRELESS DEVICE

(71) Applicant: Capital One Services, LLC, McLean, VA (US)

(72) Inventor: Gregory M. Gannon, Montpelier, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,595

(22) Filed: Jan. 10, 2018

(65) Prior Publication Data

US 2018/0130063 A1    May 10, 2018

Related U.S. Application Data

(63) Continuation of application No. 15/393,140, filed on Nov. 8, 2017, now Pat. No. 9,870,563, which is a
(Continued)

(51) Int. Cl.
*G06Q 40/00* (2012.01)
*G06Q 20/40* (2012.01)
(Continued)

(52) U.S. Cl.
CPC ....... *G06Q 20/40145* (2013.01); *G06K 7/087* (2013.01); *G06K 7/089* (2013.01);
(Continued)

(58) Field of Classification Search
USPC ....................................................... 705/36 R
See application file for complete search history.

(56) References Cited

U.S. PATENT DOCUMENTS 3,761,682 A    9/1973   Barnes et al.
5,221,838 A    6/1993   Gutman et al.
(Continued)

FOREIGN PATENT DOCUMENTS

WO    WO 01/61973 A1     8/2001
WO    WO 2004/021297 A2  3/2004

OTHER PUBLICATIONS

Ondrus, et al., A Disruption Analysis in the Mobile Payment Market, INFORGE—Ecole des HEC University of Lausanne, Switzerland, National Competence Center in Research on Mobile Information and Communication Systems (NCCRMICS), 2005, 10 pages.
(Continued)

*Primary Examiner* — Kirsten S Apple
(74) *Attorney, Agent, or Firm* — Finnegan, Henderson, Farabow, Garrett & Dunner, LLP

(57) ABSTRACT

A non-transitory computer-readable medium stores instructions causing a processor to authorize a second party to use a financial account card. The instructions comprise instructions to receive, from a first wireless device associated with a first party, a selection of a financial account card from a user input device of the first wireless device; assign, to the selected financial account card, an identity of a second party that is authorized to use the selected financial account card; receive, from a second wireless device, a request to authorize a transaction using the selected financial account card; receive an indicator of an identity of a user of the second wireless device; and authorize the transaction, based on the received indicator, when the identity of the user of the second wireless device is the authorized second party.

20 Claims, 15 Drawing Sheets

Related U.S. Application Data continuation of application No. 15/239,761, filed on Aug. 17, 2016, now Pat. No. 9,959,541, which is a continuation of application No. 14/940,901, filed on Nov. 13, 2015, now Pat. No. 9,471,922, which is a continuation of application No. 14/327,294, filed on Jul. 9, 2014, now Pat. No. 9,218,597, which is a continuation of application No. 13/965,769, filed on Aug. 13, 2013, now Pat. No. 9,165,296, which is a continuation of application No. 13/188,178, filed on Jul. 21, 2011, now Pat. No. 8,528,812, which is a continuation of application No. 11/226,219, filed on Sep. 15, 2005, now Pat. No. 7,997,476.

(51) Int. Cl.
| | |
|---|---|
| *G06Q 20/20* | (2012.01) |
| *G06Q 20/32* | (2012.01) |
| *G06Q 20/22* | (2012.01) |
| *G06Q 20/34* | (2012.01) |
| *G06K 7/08* | (2006.01) |
| *G06K 7/10* | (2006.01) |
| *G06K 19/08* | (2006.01) |
| *G07C 9/00* | (2006.01) |

(52) U.S. Cl.
CPC ..... *G06K 7/10386* (2013.01); *G06K 7/10415* (2013.01); *G06K 19/08* (2013.01); *G06Q 20/20* (2013.01); *G06Q 20/204* (2013.01); *G06Q 20/206* (2013.01); *G06Q 20/227* (2013.01); *G06Q 20/32* (2013.01); *G06Q 20/322* (2013.01); *G06Q 20/327* (2013.01); *G06Q 20/3223* (2013.01); *G06Q 20/3226* (2013.01); *G06Q 20/3278* (2013.01); *G06Q 20/353* (2013.01); *G06Q 20/3567* (2013.01); *G06Q 20/405* (2013.01); *G06Q 20/409* (2013.01); *G06Q 20/4012* (2013.01); *G07C 9/00087* (2013.01); *G07C 2009/00095* (2013.01)

(56) References Cited

U.S. PATENT DOCUMENTS

| | | | |
|---|---|---|---|
| 5,530,232 A | 6/1996 | Taylor | |
| 5,748,737 A | 5/1998 | Daggar | |
| 5,953,710 A * | 9/1999 | Fleming | G06Q 20/04 235/380 |
| 6,009,315 A | 12/1999 | De Larminat et al. | |
| 6,128,511 A | 10/2000 | Irie | |
| 6,128,604 A | 10/2000 | Sakamaki et al. | |
| 6,250,557 B1 | 6/2001 | Forslund et al. | |
| 6,275,991 B1 | 8/2001 | Erlin | |
| 6,293,462 B1 | 9/2001 | Gangi | |
| 6,425,524 B2 | 7/2002 | Pentel | |
| 6,612,488 B2 | 9/2003 | Suzuki | |
| 6,685,088 B1 * | 2/2004 | Royer | G06Q 20/04 235/380 |
| 6,755,342 B1 * | 6/2004 | Jordan, Jr. | G06Q 20/04 235/380 |
| 6,769,607 B1 | 8/2004 | Pitroda et al. | |
| 6,771,981 B1 | 8/2004 | Zalewski | |
| 6,991,172 B2 | 1/2006 | Luu | |
| 6,993,510 B2 * | 1/2006 | Guy | G06Q 20/04 705/68 |
| 7,003,316 B1 * | 2/2006 | Elias | G06Q 20/20 455/11.1 |
| 7,086,586 B1 * | 8/2006 | Sullivan | G06Q 20/10 235/379 |
| 7,137,552 B1 * | 11/2006 | Lasch | G06K 19/04 235/380 |
| 7,240,836 B2 | 7/2007 | Vrotsos et al. | |
| 7,309,012 B2 | 12/2007 | von Mueller et al. | |
| 7,336,973 B2 | 2/2008 | Goldthwaite et al. | |
| 7,349,885 B2 | 3/2008 | Gangi | |
| 7,400,883 B2 * | 7/2008 | Rivers | G06Q 20/108 455/412.1 |
| 7,445,155 B2 * | 11/2008 | Ramachandran | G06K 7/0004 235/379 |
| 7,581,678 B2 * | 9/2009 | Narendra | G06K 19/06187 235/380 |
| 7,631,803 B2 * | 12/2009 | Peyret | G06Q 20/10 235/380 |
| 7,757,944 B2 * | 7/2010 | Cline | G06Q 20/10 235/375 |
| 7,860,790 B2 * | 12/2010 | Monk | G06Q 20/10 705/35 |
| 7,925,285 B2 * | 4/2011 | Indirabhai | H04W 56/00 370/338 |
| 7,980,458 B2 * | 7/2011 | Kon | G06Q 20/042 235/375 |
| 8,005,426 B2 | 8/2011 | Huomo et al. | |
| 8,175,974 B2 | 5/2012 | Takahashi | |
| 9,881,306 B2 * | 1/2018 | Gannon | G06Q 20/405 |
| 2002/0026427 A1 | 2/2002 | Kon et al. | |
| 2002/0046185 A1 | 4/2002 | Villart et al. | |
| 2002/0065774 A1 * | 5/2002 | Young | G06Q 20/02 705/41 |
| 2002/0069177 A1 | 6/2002 | Carrott et al. | |
| 2002/0116478 A1 | 8/2002 | Paradinas et al. | |
| 2002/0130176 A1 | 9/2002 | Suzuki | |
| 2002/0174016 A1 * | 11/2002 | Cuervo | G06Q 20/00 705/16 |
| 2003/0120554 A1 | 6/2003 | Hogan et al. | |
| 2003/0172039 A1 * | 9/2003 | Guy | G06Q 20/04 705/68 |
| 2004/0104268 A1 * | 6/2004 | Bailey | G06Q 20/32 235/439 |
| 2004/0111360 A1 | 6/2004 | Albanese | |
| 2004/0117514 A1 | 6/2004 | Nelms et al. | |
| 2004/0236693 A1 * | 11/2004 | Quesselaire | G06Q 20/341 705/50 |
| 2005/0021457 A1 * | 1/2005 | Johnson | G06Q 20/04 705/39 |
| 2005/0171898 A1 * | 8/2005 | Bishop | G06Q 20/00 705/39 |
| 2005/0269401 A1 | 12/2005 | Spitzer et al. | |
| 2006/0018450 A1 * | 1/2006 | Sandberg-Diment | G06Q 20/20 379/93.12 |
| 2006/0094466 A1 | 5/2006 | Tran | |
| 2006/0165060 A1 | 7/2006 | Dua | |
| 2007/0017976 A1 * | 1/2007 | Peyret | G06Q 20/10 235/380 |
| 2007/0057038 A1 * | 3/2007 | Gannon | G06Q 20/20 235/380 |
| 2007/0162369 A1 * | 7/2007 | Hardison, III | G06Q 20/10 705/35 |
| 2007/0174166 A1 * | 7/2007 | Jones | G06Q 30/02 705/35 |
| 2007/0194113 A1 | 8/2007 | Epsin et al. | |
| 2007/0226793 A1 * | 9/2007 | Tanabiki | H04L 9/0825 726/21 |
| 2007/0262140 A1 * | 11/2007 | Long, Sr. | G06Q 20/04 235/380 |
| 2009/0281941 A1 * | 11/2009 | Worth | G06Q 20/10 705/39 |
| 2009/0281951 A1 * | 11/2009 | Shakkarwar | G06Q 20/04 705/67 |
| 2010/0063906 A1 * | 3/2010 | Nelsen | G06Q 20/28 705/30 |
| 2010/0076833 A1 * | 3/2010 | Nelsen | G06Q 20/06 705/14.25 |
| 2010/0088188 A1 * | 4/2010 | Kumar | G06Q 20/10 705/17 |
| 2011/0022472 A1 * | 1/2011 | Zon | G06Q 20/10 705/14.64 |
| 2011/0251888 A1 | 10/2011 | Faith et al. | |
| 2011/0258188 A1 | 10/2011 | AbdAlmageed et al. | |

(56) References Cited

U.S. PATENT DOCUMENTS

| | | |
|---|---|---|
| 2012/0143770 A1 | 6/2012 | Pauker et al. |
| 2012/0185378 A1* | 7/2012 | Liu ..................... G06Q 20/04 705/39 |
| 2014/0279478 A1 | 9/2014 | Goodrich |
| 2014/0380452 A1 | 12/2014 | Suwald |
| 2015/0161591 A1* | 6/2015 | Yang ................. G06Q 20/3278 235/379 |
| 2017/0103384 A1* | 4/2017 | Gannon .............. G06Q 20/353 |

OTHER PUBLICATIONS

Karnouskos, et al., Mobile Payment: A Journey Through Existing Procedures and Standardization Initiatives, The Electronic Magazine of Original Peer-Reviewed Survey Articles, Fourth Quarter 2004, vol. 6, No. 4, 23 pages.

Mobile Payments at the Physical Point-of-Sale: Assessing U.S. Market Drivers and Industry Direction, A Smart Card Alliance Report, Apr. 2005, Publication No. PT-05001, Princeton Junction, NJ, 52 pages.

Luukkainen, Towards the Next Wave of Mobile Communication, Helsinki University of Technology Publications in Telecommunications Software and Multimedia, Apr. 23, 2005, 96 pages, Espoo, Finland.

Andrew Zolli, "Best of What's Next, 2004," Popular Science Magazine, May 2004, pp. 69-79.

Cory Doctorow, "Take Back Your Cell," Popular Science Magazine, Feb. 2005, pp. 42 and 44.

\* cited by examiner

WIRELESS DEVICES FOR STORING A FINANCIAL ACCOUNT CARD AND METHODS FOR STORING CARD DATA IN A WIRELESS DEVICE

CROSS-REFERENCE TO RELATED APPLICATIONS

This application is a continuation of U.S. application Ser. No. 15/393,140 (now U.S. Pat. No. 9,870,563), filed Dec. 28, 2016, which is a continuation of U.S. application Ser. No. 15/239,761, filed Aug. 17, 2016, which is a continuation of U.S. application Ser. No. 14/940,901 (now U.S. Pat. No. 9,471,922), filed Nov. 13, 2015, which is a continuation of U.S. application Ser. No. 14/327,294 (now U.S. Pat. No. 9,218,597), filed Jul. 9, 2014, which is a continuation of U.S. application Ser. No. 13/965,769 (now U.S. Pat. No. 9,165,296), filed Aug. 13, 2013, which is a continuation of U.S. application Ser. No. 13/188,178 (now U.S. Pat. No. 8,528,812), filed Jul. 21, 2011, which is a continuation of U.S. application Ser. No. 11/226,219 (now U.S. Pat. No. 7,997,476), filed Sep. 15, 2005. The contents of these applications are all incorporated herein by reference in their entireties.

TECHNICAL FIELD

Embodiments consistent with the present invention provide wireless devices capable of storing a financial account card and methods for storing card data in a wireless device. In particular, embodiments consistent with the present invention provide a wireless device capable of reading card data from a financial account card that is inserted into the wireless device. The wireless device may store the card data and transmit the card data by radio frequency.

BACKGROUND

In a conventional credit card transaction, a credit card holder presents a financial account card, such as a credit card, to a merchant. The merchant typically swipes a magnetic stripe on the credit card through a card reader that is built into or attached to a point-of-sale (POS) terminal. The magnetic stripe generally includes account information, such as an account number of the card, an identity of the card holder, and an expiration date of the card. Once the merchant has swiped the card through the card reader, the account information is transmitted to the POS terminal. Alternatively, instead of the merchant swiping the card, the credit card holder may personally swipe the card at a self service check out station or may insert the card into a card reader built into, for example, a gasoline pump. Once the card reader has read the card data, the card data is transmitted over a secure network, authenticated, and ultimately used to authorize a transaction. In any of these kinds of transactions, however, the credit card must be physically read by a magnetic stripe reader in order to obtain the card data that is stored on the magnetic stripe.

As the prevalence of wireless devices continues to increase, new methods of storing and transmitting credit card data have begun to emerge. One such example is to use RFID (radio frequency identification) tags for transmitting payment information. RFID tags are microchips, some versions of which may store and encrypt data. Others may receive and transmit data from a processor. An RFID tag acts as a transponder and is capable of transmitting a radio frequency signal when the RFID tag receives a query radio signal from another device. Typically, the other device is an RFID reader that sends a query signal requesting a nearby RFID tag to transmit data to the RFID reader. When the RFID tag receives the query signal, the RFID tag may be powered into an "on" state. Alternatively, the RFID tag may have its own independent power supply. In either case, when an RFID tag receives a query radio signal, the RFID tag may respond by transmitting data to the reader up to a distance of a several inches or feet away, depending upon the power capabilities of the RFID tag.

In recent years, RFID tags have been incorporated in wireless devices, such as cellular phones. In addition to cellular phones, other wireless devices, such as PDAs, for example, are also being equipped with RFID tags. There are many possibilities regarding the kinds of information that an RFID tag may store and transmit. One type of information that an RFID tag may transmit is card data that provides payment information for a transaction. For example, a transaction may involve providing information for an account, such as a credit card account. In the example of a cellular phone, the card data may be securely transmitted using encryption techniques to an RFID reader when the cellular phone is placed in close proximity to the RFID reader. Accordingly, a cellular phone storing credit card data in an RFID tag or in a memory accessible by an RFID tag may be used as a payment device without requiring the actual credit card to be swiped by a magnetic card reader.

A problem often arises, however, when existing technologies must be updated or replaced to take full advantage of new technological advancements. While the transition between new and old may take a substantial amount of time due to costs associated with upgrading the existing systems, savings may result over the long term by upgrading those systems. However, companies may decide to delay a technological upgrade because it may take time to build consumer support for the upgraded system. As a result, the company may decide to delay an upgrade until more consumers have embraced the new technology. The slow acceptance of wireless devices equipped with RFID tags, along with the need for merchants to upgrade their card readers to handle payments from wireless devices, has slowed the implementation of RFID technology at POS terminals.

Consequentially, a compatibility issue has arisen because many merchants have not yet invested in RFID readers, which are needed to receive the radio signal sent by the RFID tag included in a wireless device. Instead, many merchants continue to accept payment by swiping a credit card through a magnetic card reader. Furthermore, many consumers have not yet purchased or begun using wireless devices that are equipped with RFID technology. Still further, those consumers that do have wireless devices that are equipped with RFID technology may be slow to adopt RFID features due to inexperience or security concerns. Since few consumers have adopted the technology, merchants are also unwilling to invest financially in RFID readers that are needed to receive card data providing payment information since few customers will actually make use of the technology. Transitioning more merchants will take time. While consumers continue to adopt devices using RFID technology for making card transactions and merchants invest in RFID readers, merchants will need to continue to use traditional magnetic stripe readers for processing credit card transitions. Accordingly, a transition from magnetic stripe readers to RFID readers for reading card data for a substantial number of transactions will likely occur over an extended time period due to both the costs involved and the slow adoption by consumers of wireless devices equipped with RFID tags. Furthermore, since consumers may continue to present credit cards to merchants, merchants will need to retain traditional magnetic stripe readers.

During this transitional period, there is a need for a device that bridges traditional credit card transactions and transactions that are made using wireless devices. Such a device would allow the consumer to conveniently select which type of transaction to make depending upon the merchant's technical capabilities. As a result, a consumer will be able to take advantage of the convenience of RFID technology where available but, at the same time, retain the flexibility of a traditional card. Furthermore, consumers will demand a sense of security when making transactions using RFID technology before the technology will be accepted on a large scale.

SUMMARY

Consistent with an embodiment of the present invention, a method is provided for enabling a wireless device to use card data during a purchase transaction. The method comprises receiving a financial account card into a slot of the wireless device, wherein the financial account card is stored inside of the wireless device; scanning, by a scanner included in the wireless device, a magnetic stripe on the financial account card when the financial account card is inserted into the slot; reading, from the magnetic stripe, card data; and enabling the wireless device to use the card data during the purchase transaction.

Consistent with another embodiment of the present invention a wireless device is provided. The wireless device comprises a processor; an RFID chip; and a slot for receiving a financial account card, wherein the financial account card may be stored inside of the wireless device, wherein the processor communicates card data from the financial account card to the RFID chip.

Consistent with another embodiment of the present invention, a method is provided for storing card data in a wireless device. The method comprises scanning, when a financial account card is inserted into a slot of the wireless device, card data with a magnetic stripe reader included in the wireless device; storing, in a memory include in the wireless device, a name that identifies the financial account card; and storing the card data in the memory of the wireless device, wherein the scanned card data is associated with the stored name.

Consistent with another embodiment of the present invention, a method is provided for authorizing use of a financial account card for making a purchase with a wireless device. The method comprises reading card data from a financial account card inserted into a slot of the wireless device; storing the card data in a memory included in the wireless device; receiving a security code to authorize use of the card data; and transmitting, when the security code has been authenticated, the card data from the wireless device to an RFID reader via radio frequency.

Consistent with yet another embodiment of the present invention, a method is provided for authorizing use of a financial account card for making a purchase with a wireless device. The method comprises reading card data from a financial account card inserted into a slot of the wireless device; storing the card data in a memory included in the wireless device; receiving an authorization authorizing use of the card data; and transmitting the card data from the wireless device to an RFID reader via radio frequency.

Consistent with yet another embodiment of the present invention, a method is provided for authorizing use of a financial account card for making a purchase with a wireless device. The method comprises receiving a selection of a financial account card from a display of the wireless device; determining, by a processor including in the wireless device, whether the selected financial account card is stored inside the wireless device; and when the selected financial account card is determined to be stored inside the wireless device, authorizing use of the selected financial account card.

Consistent with still yet another embodiment of the present invention, a method is provided for authorizing use of a financial account card to make a purchase using a wireless device. The method comprises receiving a selection of a financial account card from a display of the wireless device; determining, by a processor included in the wireless device, whether the selected financial account card has been used to make a prior purchase using the wireless device; and when the selected financial account card has not been used to make a prior purchase using the wireless device, authorizing the selected financial account card.

Consistent with another embodiment of the present invention, a method is provided for selecting a financial account card to provide a payment for a purchase made using a wireless device. The method comprises receiving, via radio frequency, data reflecting a purchase transaction; automatically selecting a financial account card to provide the payment for the purchase based on the received purchase transaction data; and transmitting via radio frequency card data for the selected financial account card.

Consistent with another embodiment of the present invention, a method is provided for assigning a financial account card to provide a payment for a purchase transaction made using a wireless device. The method comprises receiving a selection of a financial account card from a display of the wireless device; assigning the selected financial account card to a type of purchase; receiving, via radio frequency, data reflecting the purchase transaction; determining, by a processor including in the wireless device, whether the received purchase transaction data corresponds to the purchase type assigned to the selected financial account card; and when the purchase transaction data is determined to correspond to the purchase type assigned to the selected financial account card, transmitting card data for the selected financial account card.

Consistent with yet another embodiment of the present invention, a method is provided for authorizing use of a financial account card to make a payment for a purchase transaction using a wireless device. The method comprises receiving, from a display of the wireless device, a selection of a financial account card belonging to the user of the wireless device; determining, by a processor included in the wireless device, whether any financial account card belonging to the user, including the selected financial account card, is stored inside the wireless device; and when any financial account card belonging to the user is determined to be stored inside the wireless device, authorizing the use of the selected financial account card for the purchase transaction.

Consistent with yet another embodiment of the present invention, a method is provided for a security feature for card data of a financial account card for storage in a wireless device. The method comprises receiving the financial account card into a slot of the wireless device, wherein the financial account card is stored inside of the wireless device; reading card data from the financial account card; storing the card data in a memory included in the wireless device; and when the financial account card is removed from the slot of the wireless device, erasing the stored card data.

Consistent with still yet another embodiment of the present invention, a method is provided for authorizing a financial account card to make a purchase using a wireless device. The method comprises receiving a selection of a financial account card from a display of the wireless device; determining, by a processor included in the wireless device, an identity of the owner of the selected financial account card; determining, by the processor, an identify of an owner of a financial account card stored in the wireless device; and when the identify of the owner of the selected financial account card and the identify of the owner of the financial account card stored in the wireless device are the same, authorizing the selected financial account card to make a purchase.

Consistent with still yet another embodiment of the present invention, a method is provided for authorizing a second party to use a financial account card to make a purchase using a wireless device. The method comprises receiving a selection of a financial account card from a display of the wireless device; assigning, to the selected financial account card, an identity of a second party that is authorized to use the selected financial account card; determining, by a processor included in the wireless device, an identity of a user of the wireless device; and when the identify of the user of the wireless device is determined to be the authorized second party, authorizing the selected financial account card to make a purchase.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention. In the drawings.

DESCRIPTION OF THE EMBODIMENTS

Figure 1:
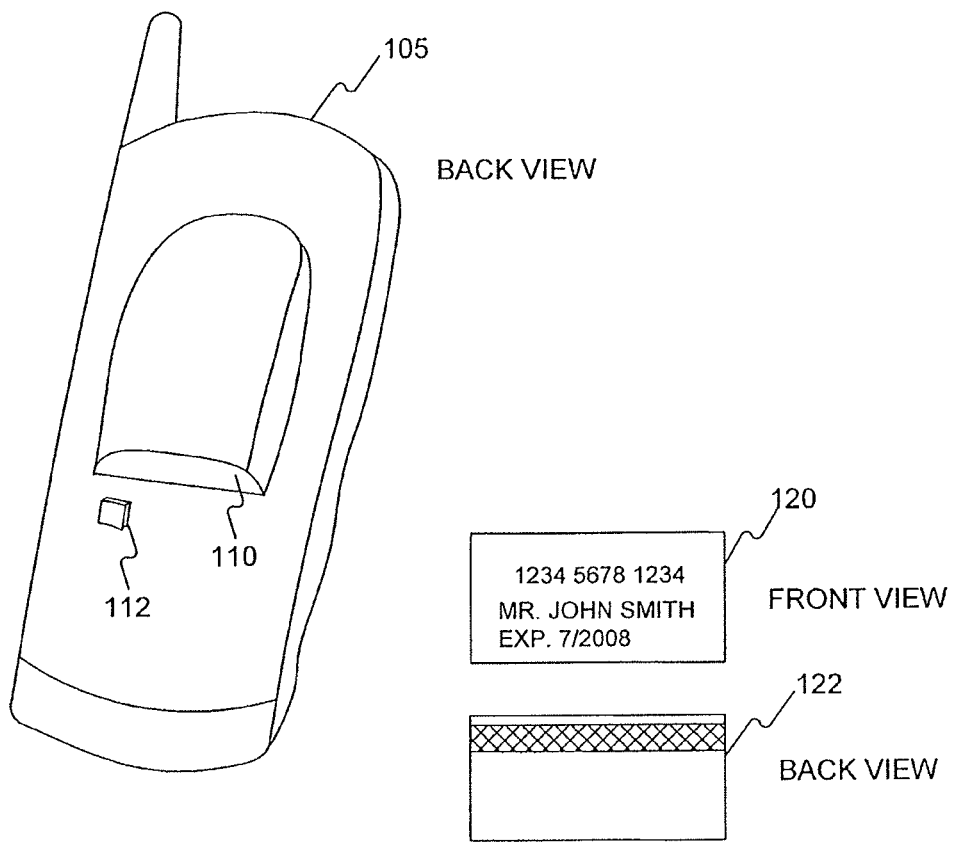
FIG. 1 shows an exemplary wireless device including a card slot for inserting a financial account card.

Embodiments consistent with the present invention provide a wireless device capable of receiving a financial account card, such as a credit card, into a card slot of the wireless device. Card data, such as account information, may be read from the card by a magnetic stripe reader as it is inserted into the card slot of the wireless device. Inserting a financial account card into the wireless device may enable and program an RFID (radio frequency identification) tag in the wireless device. For example, the wireless device may include a processor that instructs a magnetic card reader to read the magnetic stripe of the card and transmit card data to the RFID tag in the wireless device. Card data may be transformed into microcode that may be written by an RFID writer to the RFID tag in a secure format. Alternatively, card data read from the card may be stored in a memory of the wireless device and subsequently written to the RFID tag or transmitted by the RFID tag during a transaction. Furthermore, in the case of a smart card, a smart card reader may instead read card data from an inserted card, as opposed to a magnetic stripe reader.

During a transaction, a user may make a secured payment with the wireless device. In such a transaction, the card data may be transmitted by an RFID chip included in the wireless device to a nearby RFID reader. For example, a card is provided to a customer by a card issuer and the customer enables a wireless device with the card. Thereafter, the customer may either use the wireless device when providing payment or may remove the card for traditional use. When a user wishes to remove the card from the wireless device, the user may press an eject button to remove the card. Further, since the wireless device may be capable of storing a card, the wireless device can also act as a wallet. When the card is removed from the card slot of the wireless device, the user retains the option of swiping the magnetic stripe of the card through a magnetic stripe reader. The user may therefore store the card in the wireless device and, when an RFID reader is unavailable, remove the card for traditional use. Other embodiments consistent with the present invention expand upon the above exemplary wallet concept and allow a user to store multiple cards in the wireless device.

A user of the wireless device may also store data for multiple cards by inserting a first card so that the device may store card data that read from the first card. The user may then remove the first card from the wireless device, and insert a second card. As the second card is inserted into the wireless device, card data may be read from the second card and made available for storage in the wireless device. After a user has stored card data for more than one card in the wireless device, the user may select a card from a menu screen shown on a display of the wireless device.

Wireless devices consistent with embodiments of the present invention may also include security features that authorize a transaction. For example, a security validation may be required every time a transaction is made with an RFID enabled wireless device, when the selected card is not stored in the device, or for repeat transactions that use a card that was inserted into the device but subsequently removed after an initial transaction. Further, card data may be encrypted using encryption techniques so that transmitted card data cannot be intercepted in an accessible form. In other exemplary embodiments, the memory of the wireless device may be erased when a card is removed from the card slot. Furthermore, a user of the wireless device may authorize different individuals to use card data stored in the memory of the wireless device for certain accounts.

Reference will now be made to exemplary embodiments of the invention, examples of which are illustrated in the accompanying drawings. Wherever possible, the same reference numbers will be used throughout the drawings to refer to the same or like parts.

FIG. 1 shows a back view of a wireless device 105 including a card slot 110 for inserting a card 120 and an eject button 112. According to the example shown in FIG. 1, wireless device 105 is preferably a cellular phone. However, wireless device 105 may be a PDA, or other handheld device, such as a Blackberry. Although wireless device 105 shows card slot 110 on the back of the device, card slot 110 may be incorporated into any appropriate location of wireless device 105. Further, card slot 110 may be oriented in any appropriate direction for receiving card 120. In exemplary embodiments, card slot 110 may include a reader (not shown) for reading card data on card 120.

Card 120 may be a financial account card, such as a credit card, a debit card, a smart card, an ATM card, or any other card associated with a financial account and that may be used to make purchase transactions. Card 120 includes, for example, account information such as information identifying the card holder, an account number, and expiration date. Preferably, due to the small size of most wireless devices, the card is a mini card. A typical mini card is nearly half the size of a standard credit card. Further, as shown in FIG. 1, according to the back view of card 120, card 120 includes magnetic stripe 122. In the case of a smart card, card 120 will include a smart card chip (not shown), which may be read by a smart card reader included in wireless device 105 in addition to, or instead of, a reader to read magnetic stripe 122.

Once card 120 is inserted into wireless device 105, a mechanism (not shown) may hold card 120 in place such that it does not fall out of wireless device 105. Furthermore, wireless device 105 may include eject button 108 for removing card 120 from wireless device 105. For example, when a user desires to remove card 120 from wireless device 105, the user may press eject button 108, which ejects card 120 through card slot 110.

Figure 2:
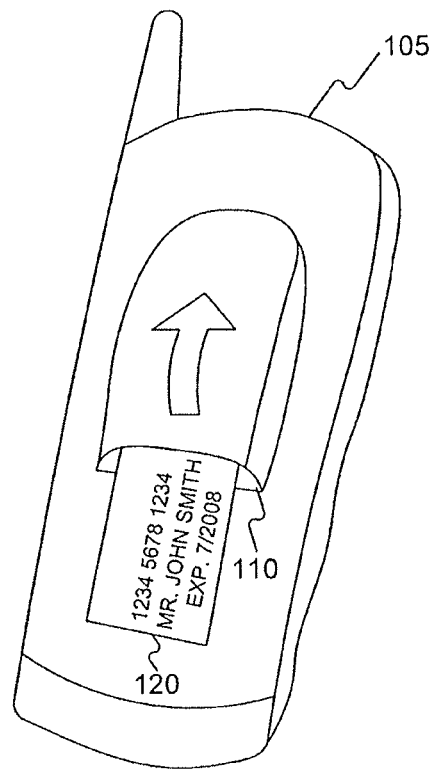
FIG. 2 shows an example of a financial account card being inserted into the card slot of the wireless device shown in FIG. 1.

FIG. 2 shows card 120 being inserted into card slot 110 of wireless device 105. When card 120 is inserted into card slot 110 of wireless device 105, a magnetic stripe reader (not shown) may read card data stored on magnetic stripe 122. Alternatively, card 120 may include a smart card chip, which may be reader by a smart card reader (not shown) included in wireless device 105. Card data may be stored in a memory of wireless device 105 or may be used to program an RFID tag included in wireless device 105, as described in further detail below. Wireless device 105 may optionally include a second card slot (not shown) for inserting a second card for storage. For example, the ability to store the second card inside of wireless device 105 provides functionality to a user similar to a traditional wallet. In such an example, wireless device 105 would store both cards, which would then be available for removal from wireless device 105. Further, in an embodiment consistent with the present invention including a second card slot, wireless device 105 may or may not include functionality for reading the second card. For example, in some embodiments, it may be necessary for a user to remove the second card from the second card slot and insert the second card into the first card slot in order for the magnetic stripe reader to read card data from the second card.

Figure 3:
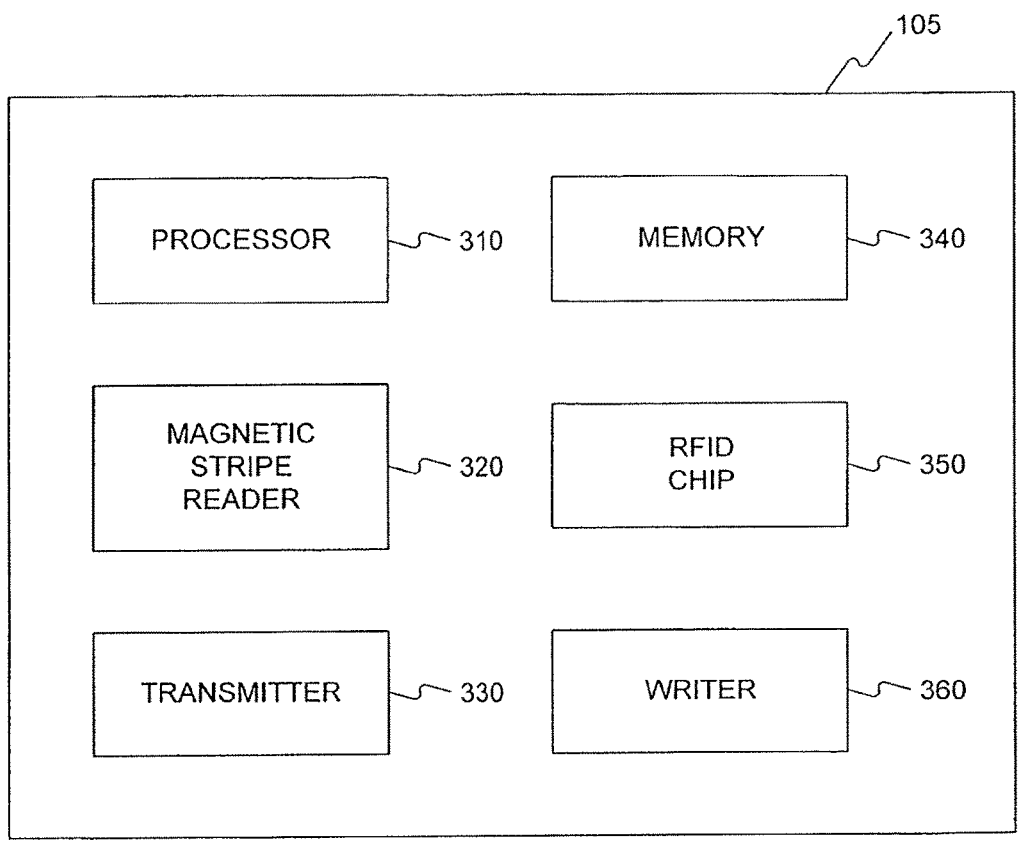
FIG. 3 is an exemplary block diagram of the components of the wireless device of FIG. 1.

FIG. 3 shows a block diagram of the components of wireless device 105. Fore example, wireless device 105 may include a processor 310, a magnetic stripe reader 320, a transmitter 330, a memory 340, an RFID chip 350, and an RFID writer 360. Other components that may be included in wireless device 105 include a battery (not shown) for supplying power to transmitter 330 and RFID chip 350. Furthermore, wireless device 105 may include a sensor (not shown) for detecting the presence of a card. Still further, wireless device 105 may include a smart card reader (not shown) in addition to, or in place of, magnetic stripe reader 320.

Processor 310 may instruct magnetic stripe reader 320 to read card data from a card as it is inserted into wireless device 105. Alternatively, a smart card reader included in wireless device 105 may read data from the card. Further, card data that has been read from a card may be stored in memory 340 or may be written by RFID writer 360 to RFID chip 350. Transmitter 330 may be used in addition to RFID chip 350 to transmit card data and/or other data from wireless device 105. For example, transmitter 330 may be used to boost the signal strength of radio frequency signals sent from wireless device 105.

Figure 4:
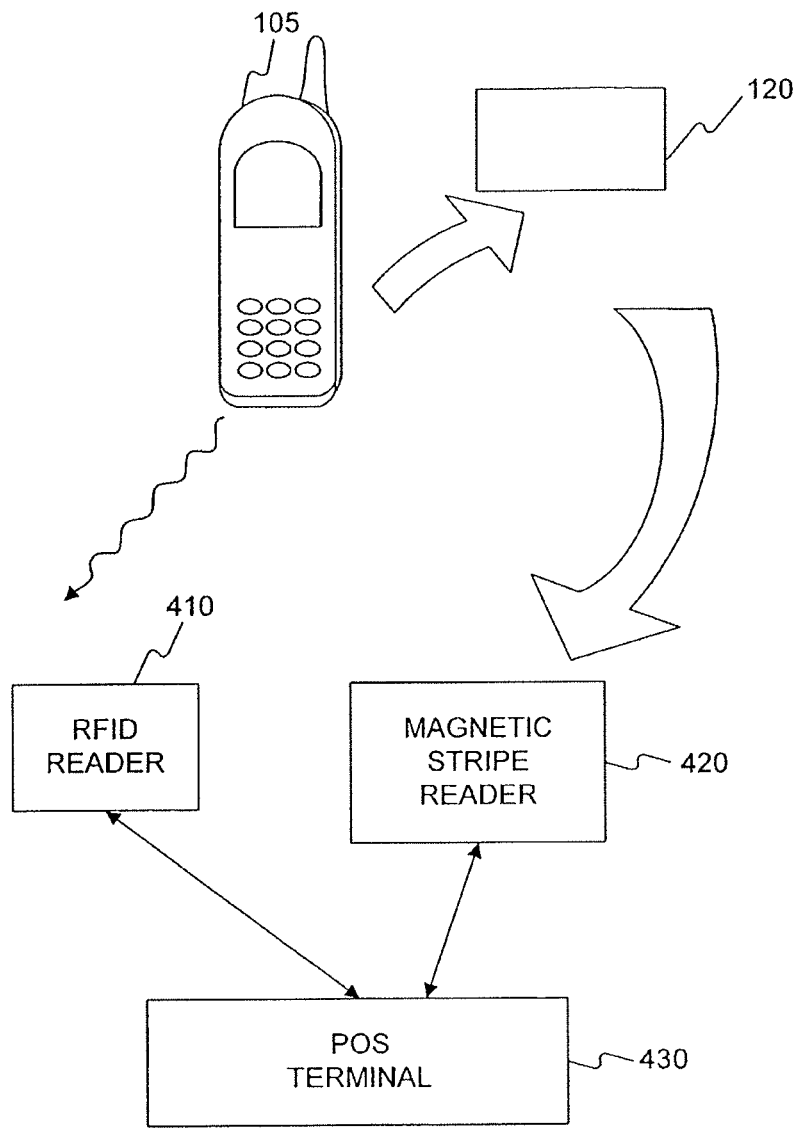
FIG. 4 is an exemplary diagram of an interaction between a wireless device, an RFID reader, and a magnetic stripe reader.

FIG. 4 shows an exemplary diagram 400 of an interaction between wireless device 105, an RFID reader 410, and a magnetic stripe reader 420. RFID reader 410 and magnetic stripe reader 420 may be connected to a point-of-sale (POS) terminal 430. POS terminal 430 receives data from RFID reader 410 and magnetic stripe reader 420 to process a transaction. A merchant may use POS terminal 430 to input data describing a purchase and to verify payment information obtained by RFID reader 410 and/or magnetic stripe reader 420.

Once POS terminal 430 has received payment information, such as account information for a credit card, POS terminal 430 may transmit the payment information in a secure format over a network (not shown) in a process that is consistent with a typical purchase transaction, such as that involving a credit card. In such a credit card transaction, for example, once an external server (not shown) verifies and approves the credit card transaction, authorization for the transaction may be sent over the network to POS terminal 430.

As shown in FIG. 4, wireless device 105 may also transmit payment information by radio frequency to RFID reader 410. In such a situation, a user will hold wireless device 105 near RFID reader 410 at, for example, the direction of the merchant or after being prompted by a message shown on a display (not shown) of RFID reader 410 requesting the user to provide payment information. Alternatively, card 120 may be removed from wireless device 105 and swiped through magnetic stripe reader 420. In such a situation, the user retains the ability to use the card for payment when a merchant does not have RFID technology for accepting payment information.

Figure 5:
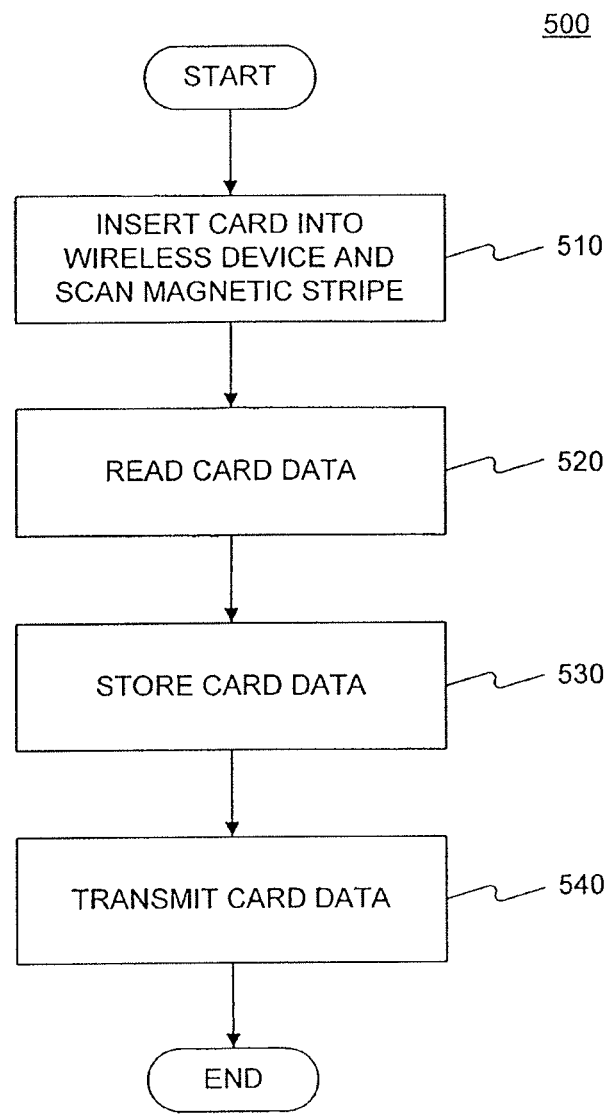
FIG. 5 is an exemplary flow diagram of a method for enabling a wireless device to store card data.

FIG. 5 shows an exemplary flow diagram 500 of a method for enabling wireless device 105 to store card data. In step 510, at the start of the process, a card may be inserted into card slot 110 of wireless device 105. As the card is inserted into card slot 115 of wireless device 105, magnetic stripe scanner 320, which may be included in wireless device 105, may scan a magnetic stripe on the card to read card data. (Step 520.) The card may be physically stored inside of wireless device 105 after it is inserted and read. Next, the card data may be stored in memory 340 included in wireless device 105 in an encrypted form, as shown in step 530. Alternatively, RFID writer 360 may program RFID chip 340 to store card data in an encrypted format. In step 540, when a user of wireless device 105 wishes to make a purchase, the user may instruct wireless device 105 to transmit the card data from wireless device 105 to RFID reader 410 via radio frequency.

Figure 6:
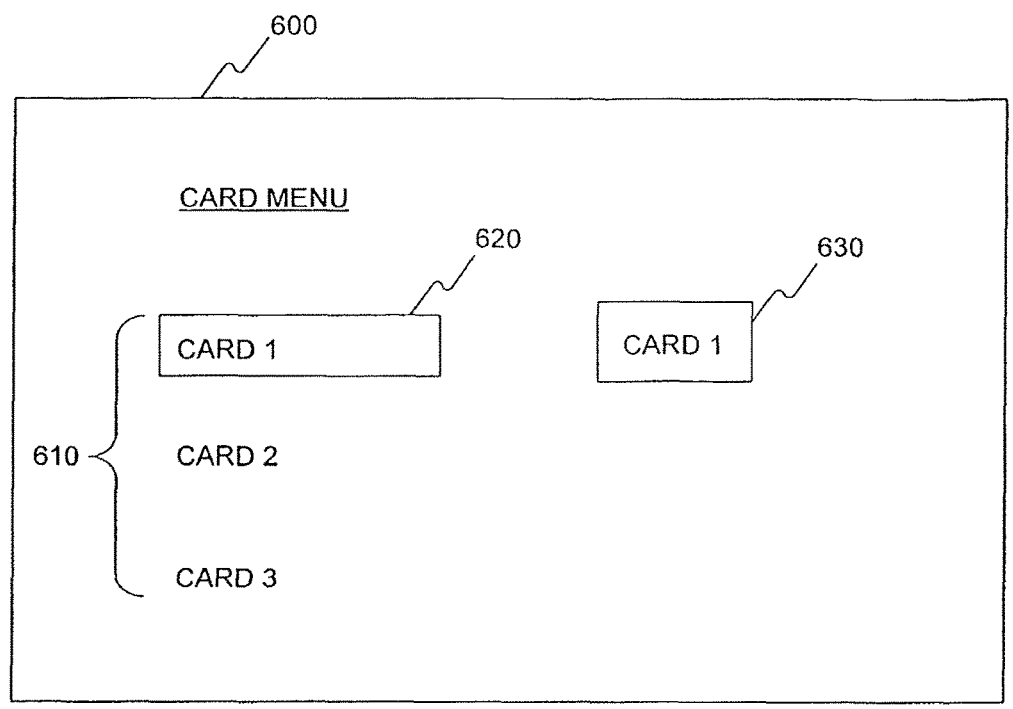
FIG. 6 is an exemplary menu of stored cards that is shown on a display of a wireless device.

FIG. 6 shows an exemplary display 600 of wireless device 105, which may include a menu 610 of cards that have card data stored in wireless device 105. As shown in FIG. 6, menu 610 may include a list of three cards designated as card 1, card 2, and card 3. Further, card 1 is shown as having been selected by selection box 620. Selection box 620 may be, for example, a highlighted border surrounding a selected item shown on display 600. A user may make a selection from menu 610 by using input keys (not shown) of wireless device 105, or by touching display 600. Furthermore, as shown in the exemplary embodiment of FIG. 6, card 1 may also be represented by image 630, which shows a graphical image of a card. Alternatively, card 1 may be selected for use in making a purchase by selecting image 630 using input keys or by touching display 600. Image 630 may be an image of a credit card, a logo, text, or any graphical image that the user has associated with card 1.

For example, a user may access menu 610 on wireless device 105. As shown in FIG. 6, menu 610 displays one or more cards that have card data stored in wireless device 105. The user may select a card, such as card 1, by using input keys, for example, from menu 610. Alternatively, the user may select card 1 by selecting image 630. Thereafter, the user may use wireless device 105 to make a purchase with card 1. A user may therefore make selections from menu 610 to select a particular card for a transaction. Security features, which are discussed in more detail below, may be used to determine whether a transaction may proceed with a selected card. For example, in some embodiments consistent with the present invention, a security code may be required before a selected card may be used to make a transaction.

Figure 7:
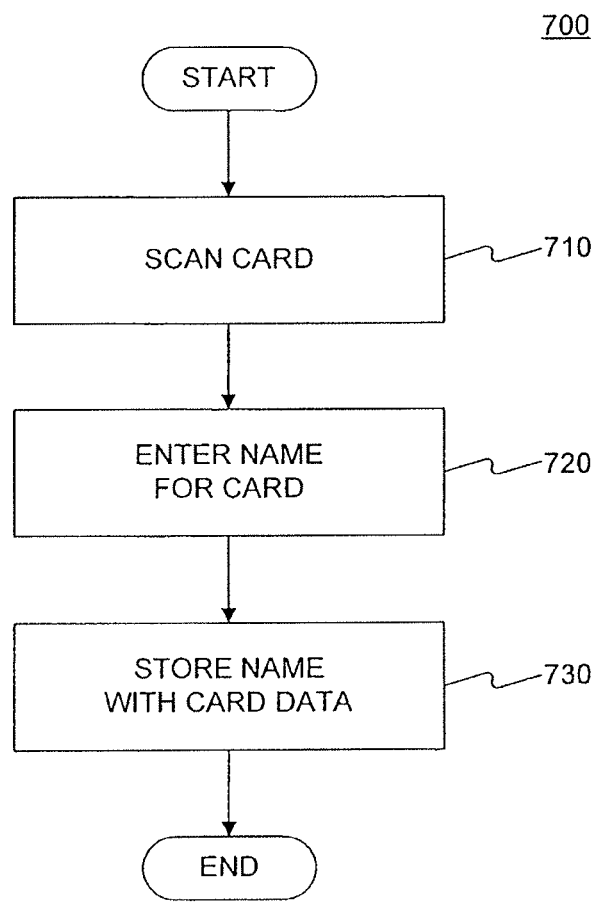
FIG. 7 is an exemplary flow diagram of a method for storing card data in a wireless device.

FIG. 7 shows an exemplary flow diagram 701 of a method for storing card data in wireless device 105. As a card is inserted into card slot 115 of wireless device 105, card data may be scanned by magnetic stripe reader 320. (Step 710.) The scanned card data may be stored in memory 340 included in wireless device 105. Next, a user may specify a name that identifies the card. (Step 720.) For example, the user may select a default name, such as MasterCard or Visa, or may enter a personalized name via input keys. The card data may then be stored in memory 340 such that the card data is associated with the stored name selected by the user. (Step 730.) Thereafter, the user may select the card, for example, from menu 610 as shown in FIG. 6, for use in a transaction by selecting the stored name. Alternatively, as discussed above, the user may select a card by selecting a text name, a graphical image, or logo from display 600.

Figure 8:
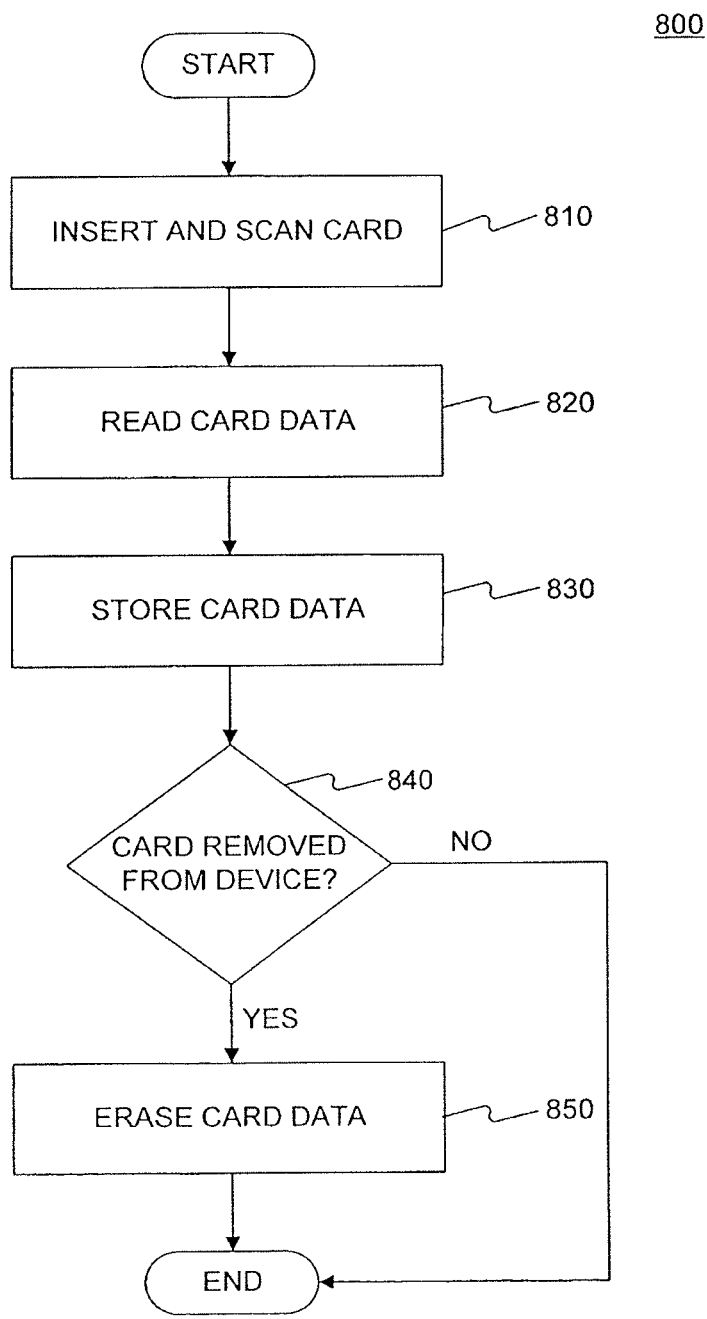
FIG. 8 is an exemplary flow diagram of a method for providing a security feature for card data stored in a wireless device.

FIG. 8 shows an exemplary flow diagram 800 of a method for providing a security feature for card data stored in wireless device 105. In step 810, a card is inserted into card slot 115 of wireless device 105. The card may be subsequently stored inside wireless device 105. Magnetic stripe reader 320 included in wireless device 105 scans a magnetic stripe as, for example, the card is inserted into card slot 115, such that reader 320 can read card data from the magnetic stripe. (Step 820.) The card data is stored in memory 330 included in wireless device 105. (Step 830.) Next, processor 310 may receive from a sensor an indication of whether or not the card has been removed from wireless device 105. If the card has been removed from card slot 115 because, for example, a user has pressed eject button 111 on wireless device 105, an instruction may be sent by processor 310 to memory 340 or RFID chip 350 to erase the stored card data. (Step 850.) As a result, card data for a removed card is no longer available via wireless device 105. A user will therefore be required to insert a card into wireless device 105, thereby requiring the user to have physical possession of the card.

Figure 9:
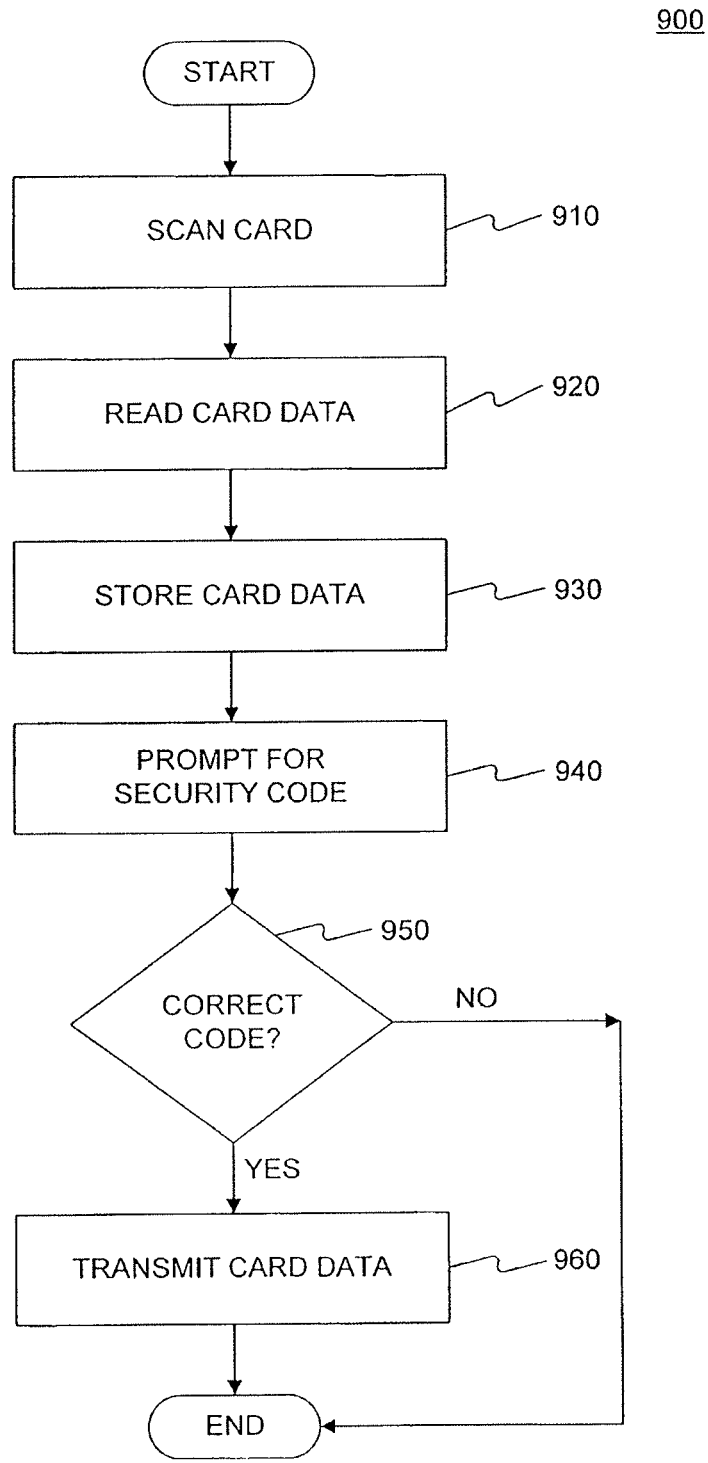
FIG. 9 is an exemplary flow diagram of a method for authorizing use of a card to make a purchase with a wireless device.

FIG. 9 shows an exemplary flow diagram 900 of a method for authorizing use of a card to make a purchase with wireless device 105. Magnetic stripe reader 320 included in wireless device 105 scans a magnetic stripe on the card. (Step 910.) Card data is read from the magnetic stripe. (Step 920.) The card data may be stored in memory 340 or in RFID chip 350 included in wireless device 105. (Step 930.) When a user selects the card for making a purchase, a prompt may require the user to enter a security code to authorize use of the card data. (Step 940.) In step 950, processor 310 may determine whether the correct security code has been entered by comparing the entered code with a code stored in memory 340 of wireless device 105. For example, the security code may be stored in an encrypted form in wireless device 105. After validating the security code, use of the card data is authorized and wireless device 105 transmits, when the security code has been authenticated, the card data from wireless device 105, as shown in step 960. If the security code was incorrectly entered, the process ends.

For example, card data may be transmitted from wireless device 105 to a nearby RFID reader. The RFID reader may be included in and/or connected to a POS terminal, as shown in FIG. 4. Further, the security code may be entered by the user via input keys on wireless device 105. Alternatively, the security code may be entered by the user at the POS terminal and transmitted over a network to an external server for validation. The security code may be a personal identification number (PIN). In other embodiments consistent with the present invention, instead of a security code, authorization may be provided by a fingerprint, voice print, or retinal scan of the user. Also, in any of the above embodiments, the security code may be received by wireless device 105 or by a POS terminal.

Figure 10:
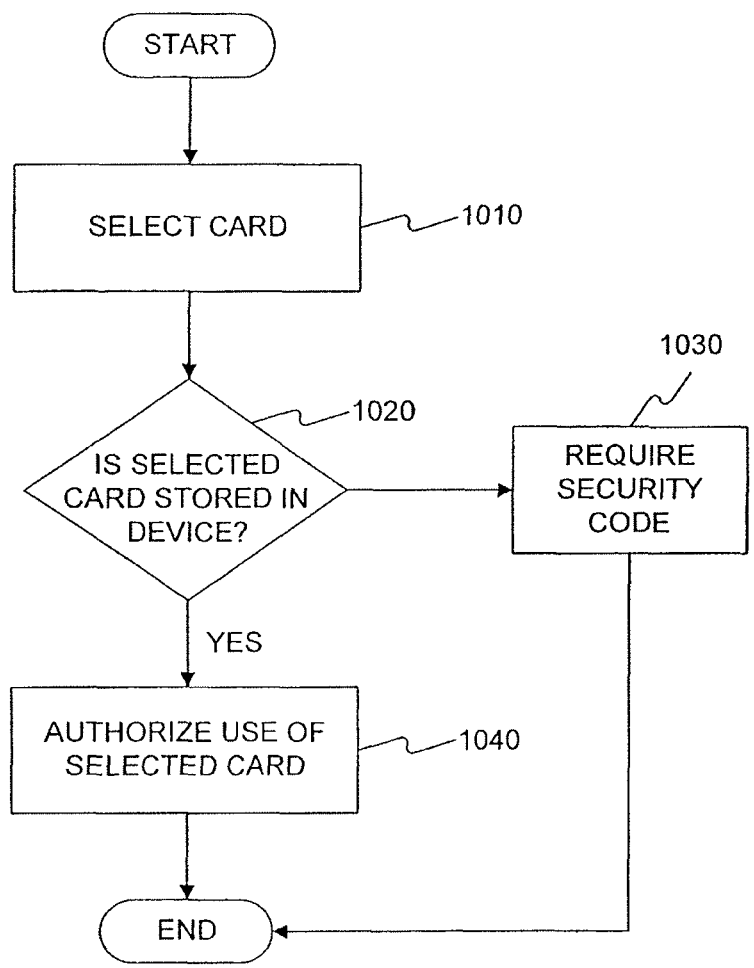
FIG. 10 is an exemplary flow diagram of a method for authorizing use of a card to make a purchase with a wireless device.

FIG. 10 shows an exemplary flow diagram 1000 of a method for authorizing use of a card to make a purchase with wireless device 105. A user may select a card to make a purchase from display 600 of wireless device 105 using menu 610. (Step 1010.) Processor 310 included in wireless device 105 may determine whether the selected card is stored inside the wireless device. (Step 1020.) When the selected card is not determined to be stored inside wireless device 105, wireless device 105 may require a security code. (Step 1030.) When the selected card is determined to be stored inside wireless device 105, t device 105 may become authorized to use the selected card. (Step 1040.) In the event that use of the card is authorized, card data for the card may be transmitted via radio frequency.

Figure 11:
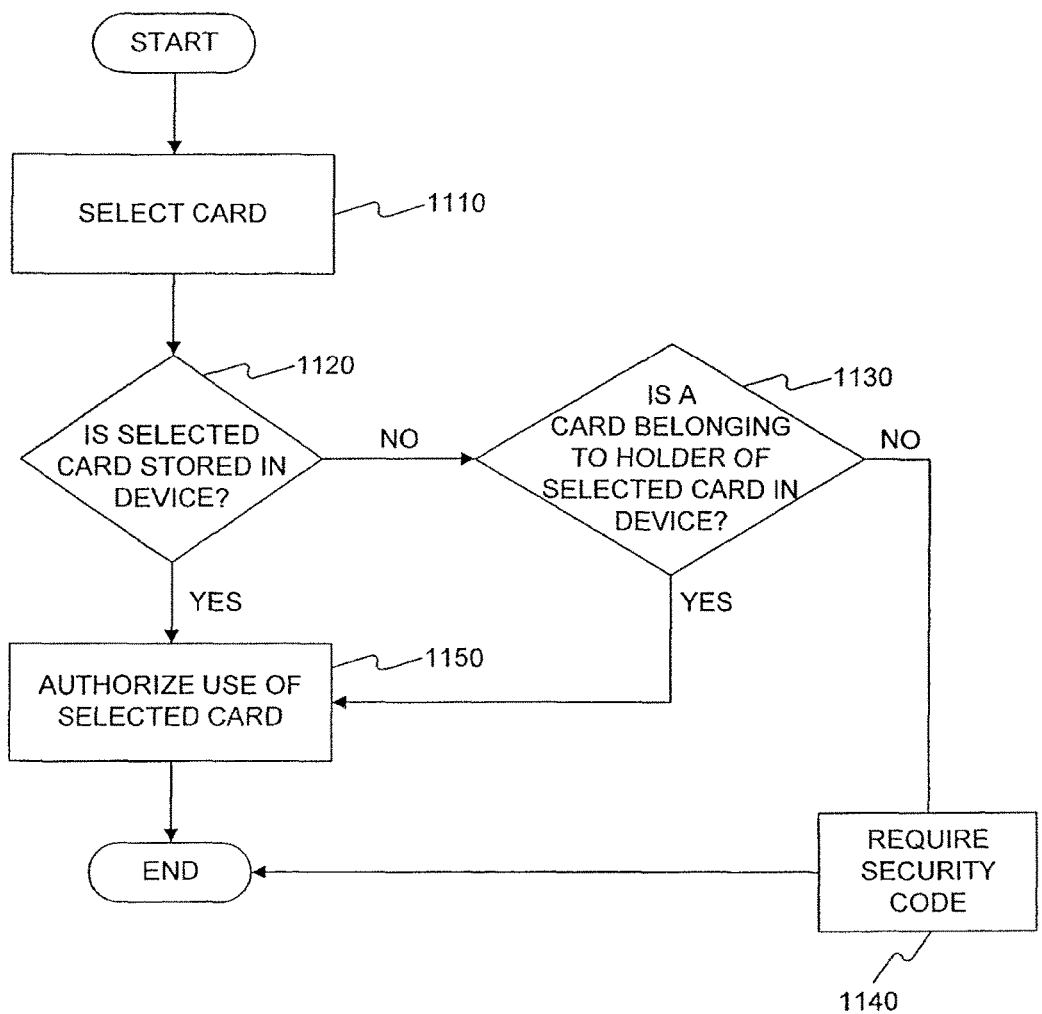
FIG. 11 is an exemplary flow diagram of a method for authorizing a card to make a payment using a wireless device.

FIG. 11 shows an exemplary flow diagram 1100 of a method for authorizing a card to make a payment using wireless device 105. A user may select a card to make a purchase from a display of wireless device 105 using menu 600. (Step 1110.) When the selected card is determined to be stored inside wireless device 105 (step 1120—"Yes"), the wireless device may become authorized to use the selected card. (Step 1150.) When the selected card is not determined to be stored inside wireless device 105 (step 1120—"No"), processor 310 included in wireless device 105 may determine whether any other card belonging to the user is stored inside the wireless device. (Step 1130.) When any card belonging to the user is determined to be stored inside the wireless device (step 1130—"Yes"), use of the selected card is authorized, and the process may proceed to step 1150. In step 1150, use of the selected card is authorized. However, in step 1130, when a card belonging to the user is not determined to be stored inside the wireless device (step 1130—"No"), the process may proceed to step 1140, and wireless device 105 may require a security code or prohibit use of the selected card. Furthermore, a user of wireless device 105 may have to establish his or her identity by providing, for example, a PIN. The identify of an owner of a card stored in the wireless device may be determined by accessing encrypted data stored in wireless device 105.

Figure 12:
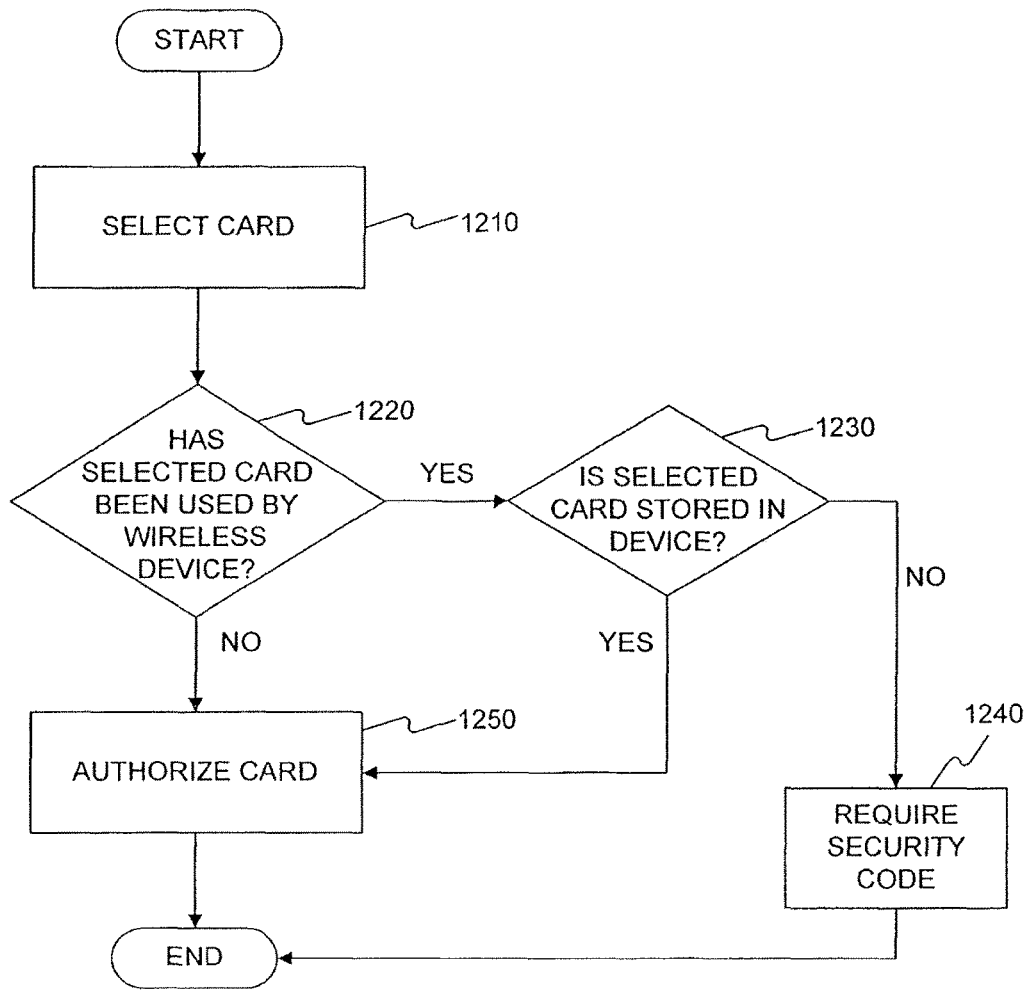
FIG. 12 is an exemplary flow diagram of a method for authorizing of a card to make a purchase using a wireless device.

FIG. 12 shows an exemplary flow diagram 1200 of a method for authorizing a card to make a purchase using wireless device 105. Authorization may be required only for repeat transactions using a particular card and not the initial transaction. For example, the user may select a card to make a purchase from menu 610 of wireless device 105. (Step 1210.) Processor 310 included in wireless device 105 may determine whether the selected card has been used to make a prior purchase with wireless device 105. (Step 1220.) When the card has not been used to make a prior purchase using wireless device 105, the process proceeds to step 1250 and use of the card is authorized. When the card has been used to make a prior purchase using wireless device 105, processor 310 determines whether the selected card is stored in wireless device 105. (Step 1230.) When the selected card is not stored in wireless device 105, wireless device 105 may require a security code. (Step 1240.) If the selected card is stored in wireless device 105, the process proceeds to step 1250, and the card is authorized.

Figure 13:
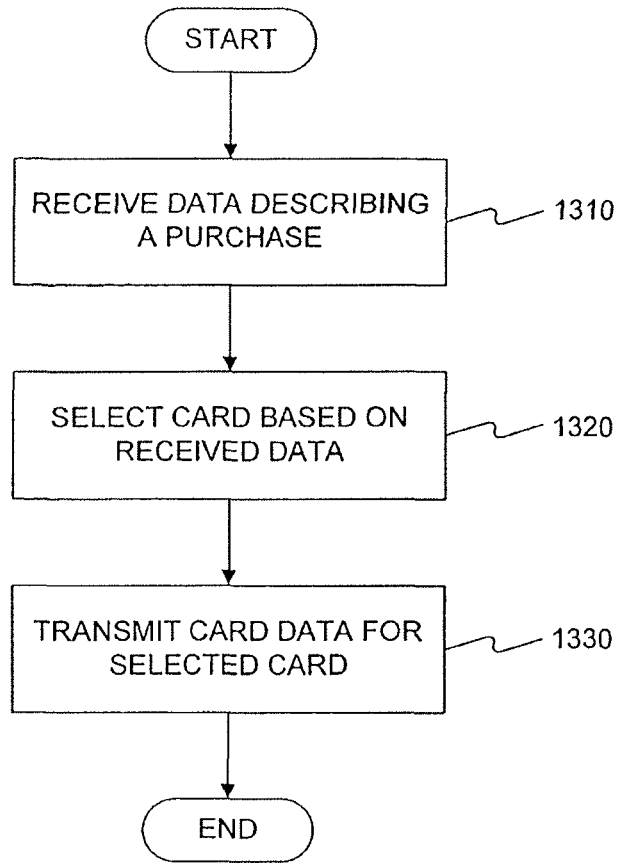
FIG. 13 is an exemplary flow diagram of a method for selecting a card to provide a payment for a purchase made using a wireless device.

FIG. 13 shows an exemplary flow diagram 1300 of a method for selecting a card to provide a payment for a purchase made using wireless device 105. In step 1310, wireless device 105 may receive, via radio frequency from a POS terminal 430, data reflecting a purchase transaction. Using the received data, wireless device 105 may automatically select a card to provide the payment for the purchase. (Step 1320.) Next, wireless device 105 transmits via radio frequency card data for the selected card to POS terminal 430. (Step 1330.) Accordingly, a card may be selected automatically by the wireless device 105 based upon received purchase transaction data. For example, a user may specify that food purchases should use a specified account for payment and that gasoline purchases may automatically use a different account that is specified by the user.

Figure 14:
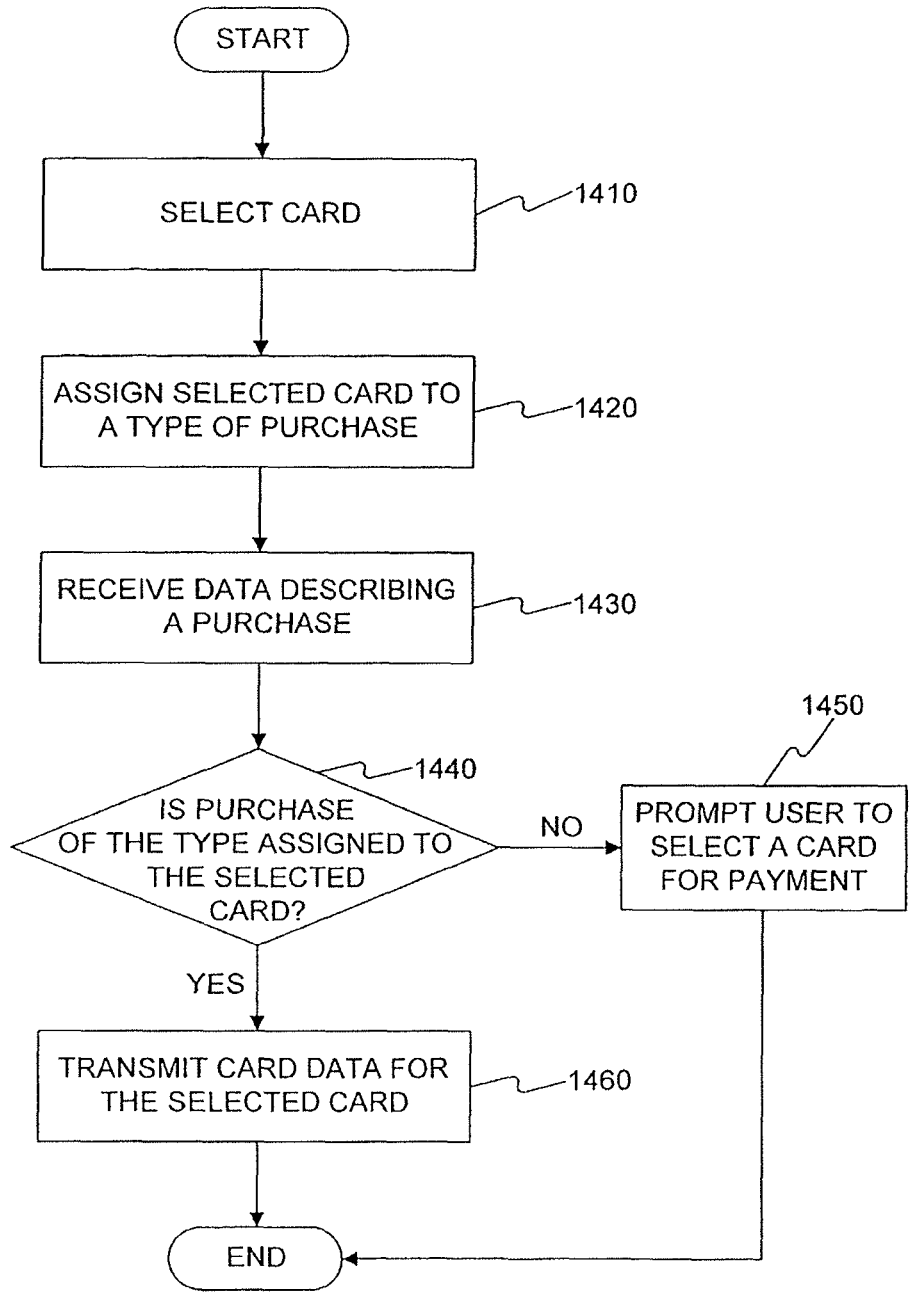
FIG. 14 is an exemplary flow diagram of a method for assigning a card for providing a payment using a wireless device.

FIG. 14 shows an exemplary flow diagram 1400 of a method for assigning a card for providing a payment using a wireless device. In step 1410, a card is selected from menu 600 shown on a display of wireless device 105. The selected card may be assigned to a type of purchase by the user. (Step 1420.) Subsequently, wireless device 105 may receive, via radio frequency from a POS terminal 430, data reflecting a purchase transaction. (Step 1430.) Processor 310 included in wireless device 105 may determine whether the purchase is of the type assigned to the selected card. (Step 1440.) When the purchase is determined to be of the type assigned to the selected card, wireless device 105 may transmit card data for the selected card to POS terminal 430. (Step 1460.) When the purchase is determined not to be of the type assigned to the selected card, wireless device 105 may prompt the user to select a card for payment. Step 1450.

Figure 15:
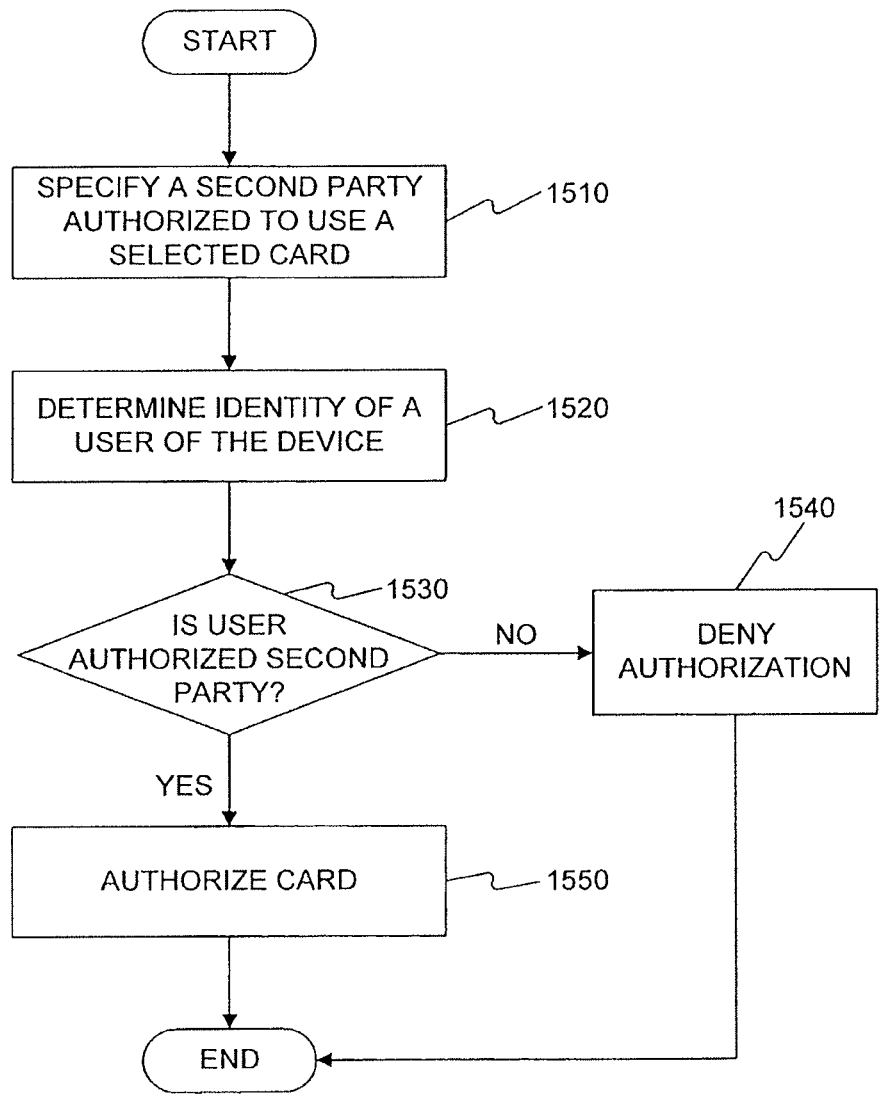
FIG. 15 is an exemplary flow diagram of a method for authorizing a second party to use a card to make a purchase with a wireless device.

FIG. 15 shows an exemplary flow diagram 1500 of a method for authorizing a second party to use a card to make a purchase with wireless device 105. In step 1510, a user may select a card from menu 610 shown on display 600 of wireless device 105. The user may have previously assigned to the selected card an identity of a second party that is authorized to use the selected card. Accordingly, processor 310 included in wireless device 105 may next determine in step 1520 an identity of a user of wireless device 105. This may be done by validating a security code or other information, such as biometrics. When the identity of the user of the wireless device 105 is determined to be an authorized second party (step 1530—"Yes"), device 105 may authorize use of the selected card to make a purchase. (Step 1550.) Otherwise (step 1530—"No"), the process proceeds to step 1540 and authorization is denied.

Accordingly, in systems consistent with the invention, a wireless device may be enabled to receive a card that is inserted into a card slot of the wireless device. The wireless device may read card data from the card and transmit the card data via radio frequency to a nearby RFID reader. The card may also be ejected from the wireless device and swiped by a magnetic stripe reader. Furthermore, in embodiments consistent with the present invention, security features may prevent unauthorized use of card data stored in a wireless device.

The foregoing descriptions have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone.

Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A non-transitory computer-readable medium storing instructions that, when executed on one or more processors, cause the one or more processors to:

receive, from a first wireless device associated with a first party, a selection of a financial account card from a user input device of the first wireless device;

assign, to the selected financial account card, an identity of a second party that is authorized to use the selected financial account card;

receive, from a second wireless device, a request to authorize a transaction using the selected financial account card;

receive an indicator of an identity of a user of the second wireless device; and authorize the transaction, based on the received indicator, when the identity of the user of the second wireless device is the authorized second party.

2. The non-transitory computer-readable medium of claim 1, wherein the indicator comprises a security code.

3. The non-transitory computer-readable medium of claim 2, wherein the security code comprises a personal identification number (PIN).

4. The non-transitory computer-readable medium of claim 1, wherein the indicator comprises at least one biometric.

5. The non-transitory computer-readable medium of claim 4, wherein the at least one biometric comprises at least one of a fingerprint, a voice print, or a retinal scan.

6. The non-transitory computer-readable medium of claim 1, wherein the instructions further cause the one or more processors to deny the transaction, based on the received indicator, when the identity of the user of the second wireless device is not the authorized second party.

7. The non-transitory computer-readable medium of claim 1, wherein the instructions further cause the one or more processors to:

receive a type of transaction to associate with the selected financial account card;

compare, based on the received request, a type of the requested transaction to the type of transaction associated with the selected financial account; and based on the comparison, when the type of the requested transaction is the type of transaction associated with the selected financial account, authorize the transaction.

8. The non-transitory computer-readable medium of claim 1, wherein the instructions further cause the one or more processors to deny the transaction, based on the comparison, when the type of the requested transaction is not the type of transaction associated with the selected financial account.

9. The non-transitory computer-readable medium of claim 1, wherein the instructions further cause the one or more processors to prompt the user for selection of a different financial account card, based on the comparison, when the type of the requested transaction is not the type of transaction associated with the selected financial account.

10. The non-transitory computer-readable medium of claim 1, wherein receiving the indicator comprises accessing encrypted data stored in the second wireless device and extracting the indicator therefrom.

11. A method for authorizing a second party to use a financial account card, executed by one or more processors, the method comprising:

receiving, from a first wireless device associated with a first party, a selection of the financial account card from a user input device of the first wireless device;

assigning, to the selected financial account card, an identity of the second party that is authorized to use the selected financial account card;

receiving, from a second wireless device, a request to authorize a transaction using the selected financial account card;

receiving an indicator of an identity of a user of the second wireless device; and authorizing the transaction, based on the received indicator, when the identity of the user of the second wireless device is the authorized second party.

12. The method of claim 11, wherein the indicator comprises a security code.

13. The method of claim 12, wherein the security code comprises a personal identification number (PIN).

14. The method of claim 11, wherein the indicator comprises at least one biometric.

15. The method of claim 14, wherein the at least one biometric comprises at least one of a fingerprint, a voice print, or a retinal scan.

16. The method of claim 11, further comprising denying the transaction, based on the received indicator, when the identity of the user of the second wireless device is not the authorized second party.

17. The method of claim 11, further comprising:

receiving a type of transaction to associate with the selected financial account card;

comparing, based on the received request, a type of the requested transaction to the type of transaction associated with the selected financial account; and authorizing the transaction, based on the comparison, when the type of the requested transaction is the type of transaction associated with the selected financial account.

18. The method of claim 11, further comprising, based on the comparison, when the type of the requested transaction is not the type of transaction associated with the selected financial account, denying the transaction.

19. The method of claim 11, further comprising prompting the user for selection of a different financial account card, based on the comparison, when the type of the requested transaction is not the type of transaction associated with the selected financial account.

20. The method of claim 11, wherein receiving the indicator comprises accessing encrypted data stored in the second wireless device and extracting the indicator therefrom.

* * * * *